June 30, 1953 E. R. DOAK 2,643,754
FRUIT GATHERER
Filed Nov. 3, 1947 5 Sheets-Sheet 3

INVENTOR.
Edmond R. Doak
BY
Lyon+Lyon
ATTORNEYS

Patented June 30, 1953

2,643,754

UNITED STATES PATENT OFFICE 2,643,754

FRUIT GATHERER

Edmond R. Doak, Los Angeles, Calif.

Application November 3, 1947, Serial No. 783,722

2 Claims. (Cl. 198—11)

The present invention relates to apparatus for collecting articles disposed in random positions on the surface of the ground and has particular utility in harvesting fruits and vegetables lying on the surface of the ground. The apparatus may also be useful, for example, to collect golf balls randomly distributed in a golf driving range, these enumerated uses being exemplary of other fields where the present invention may find utility.

A principal object of the present invention is to provide improved harvesting apparatus arranged to harvest fruits and vegetables from the surface of the ground upon which they may rest after falling from trees, bushes, plants and the like.

In accordance with an important aspect of the present invention a vehicular harvester has mounted thereon an endless belt with resilient fingers thereon arranged to cooperate with the ground plane to propel fruit such as prunes along the ground and to then lift them into a suitable container. The flexible fingers that are attached to the belt impart a gentle propelling motion to the fruit as the fingers contact the fruit on the ground, the fingers continue to propel the fruit along the ground due to the belt movement and the forward travel of the vehicle until it reaches an inclined loading platform. The fingers then carry the fruit up the platform to the discharge chute where stationary fingers intermeshed with the fingers on the moving belt disengage any fruit that has become lodged between the fingers and the fruit is deposited in a chute for discharge into the container.

It is not uncommon for a grower of fruits such as prunes, apples and the like to allow such fruits to rot on the ground after they have fallen since the expense encountered in harvesting such fruits from the ground is greater or substantially equal to the profit resulting from the ultimate sale of the fruit.

Further, often times fruits are picked prematurely to avoid excessive loss which would otherwise result from some of the fruit falling onto the ground and in such case the fruit has not been allowed to fully achieve the increased sugar content which would otherwise be acquired. This is so even though the ultimate sales price of the fruit is based on the sugar content of the fruit.

It is therefore an object of the present invention to provide harvesting apparatus which may inexpensively and efficiently harvest fruit lying on the ground thus preventing waste and allowing the producer to maintain fruit on trees until they are sufficiently tree ripened to an extent where the sugar content of the fruit is relatively high.

Yet another object of the present invention is to provide an improved harvester characterized by its simplicity of construction arranged to efficiently gather fallen fruit from the ground surface without injuring the fruit.

Still another object of the present invention is to provide an improved harvester having resilient fingers thereon which approach and contact fruit to be harvested in such a manner as to propel and lift the fruit without injuring the same.

Yet another object of the present invention is to provide an improved harvester which requires a minimum amount of effort on the part of the attendant.

Still a further object of the present invention is to provide an improved harvester for harvesting fruit off the surface of the ground even though the ground may have substantial irregularities in its surface.

Still another object of the present invention is to provide an improved harvester which includes resilient fingers mounted on a belt arranged to initially propel the fruit and then to raise the same.

A further object of the present invention is to provide an improved harvester which utilizes the surface of the ground as a support in the operation of propelling fruit in a harvesting operation.

Still another object of the present invention is to provide an improved harvester arranged to gather fruits or vegetables from the surface of the ground without puncturing their outer skins.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in plan elevation of a harvester embodying the present invention.

Figures 24 and 25 show modified structures for adjusting the height of the endless belt.

Figures 26 and 27 show a modified structure for use as a loading platform.

Figures 28 and 29 show a modified arrangement wherein the endless belt is used in apparatus for segregating articles according to size.

Figures 1, 4, 25, 26, 27, 28, 29:
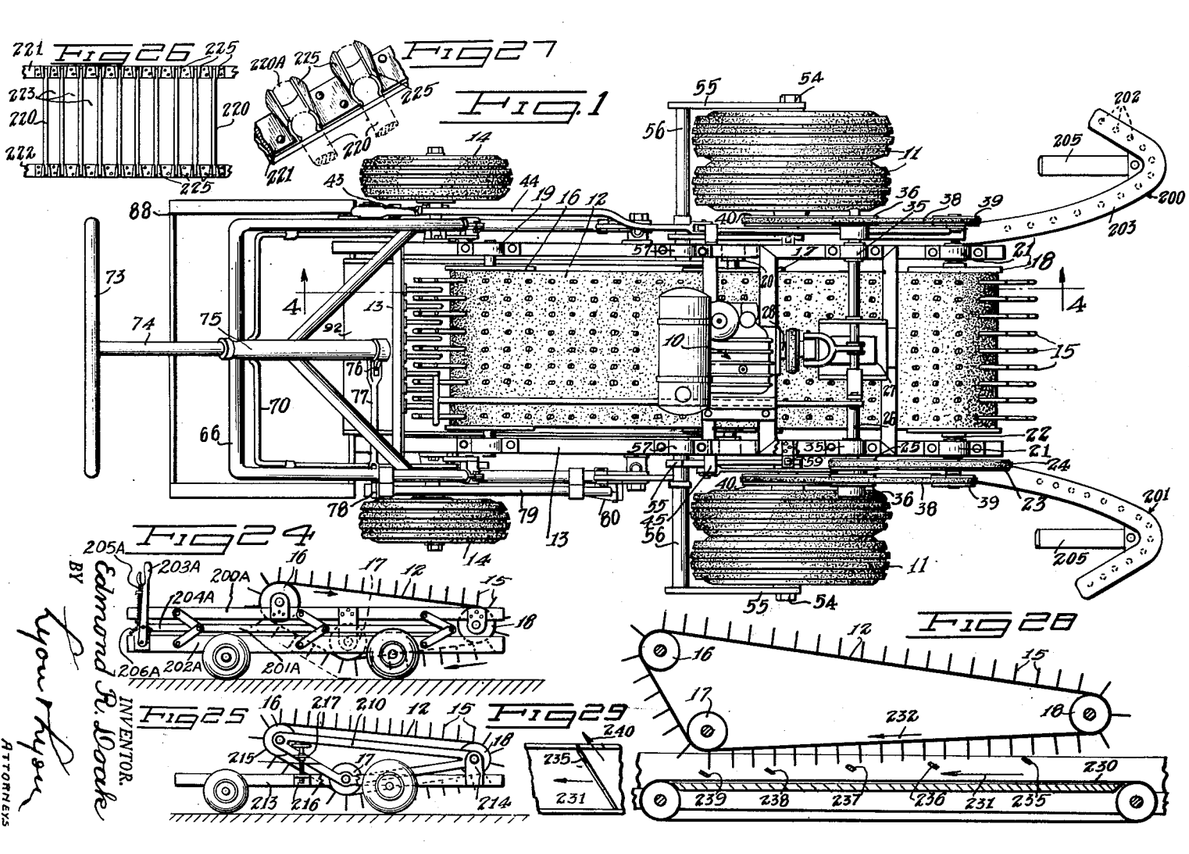

In accordance with certain features of the present invention the harvester incorporates an endless belt 12 having a plurality of fingers 15 extending outwardly therefrom, is arranged to travel in the path indicated perhaps more clearly in Figure 4 to initially propel fruit along the surface of the ground and then to raise the fruit upwardly on a loading platform into a suitable receptacle.

The harvester is a self-propelled vehicle which may be propelled by the front drive wheels 11 and steered by the rear steering wheels 14, the wheels 11, 14 being mounted for rotation on the chassis or frame 13 of the vehicle which also has mounted thereon the endless belt 12 in accordance with important features of the present invention.

The driving wheels 11 and endless belt 12 may both be driven by the internal combustion engine 10.

The endless belt 12 having the outwardly extending resilient fingers 15 mounted thereon is mounted for guided movement over the rear idler pulley 16, the lower idler pulley 17, and the front driving pulley 18, these pulleys 16, 17, 18 being journaled for rotation in bearings 19, 20, 21 respectively.

The belt driving pulley 18 has its shaft 22 journalled in bearings 21 with a pulley 23 thereon to provide a driving connection with the engine 10, such driving connection including as elements thereof: pulley 23, belt 24, pulley 25 mounted on rotatable shaft 26, reduction gear 27 from which output shaft 26 extends, the input shaft 28 of the reduction unit 27, pulley 29 mounted on shaft 28, belt 30 and clutch 31, to the output shaft of the engine 10. This clutch 31 may be of the conventional split pulley type and may be actuated to and from clutch engaging and clutch disengaging positions from the rear of the vehicle by the manually operable thrust rod 32 which is supported for guided movement on the frame 13 with the forward end thereof pin connected to one end of link 33 which has its other end pin connected to supporting frame 13 with an intermediate point on link 33 pin connected to the clutch actuating rod 34.

Figure 7:
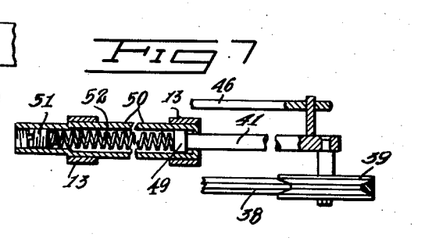
Figure 7 is a sectional view taken substantially on line 7—7 of Figure 2.

It is noted that the motion transmitting reduction gear shaft 26 which is journalled for rotation in spaced bearings 35 not only has pulley 25 mounted thereon for transmitting motion to the endless belt 12 in the manner described above but also has a pair of spaced pulleys 36 thereon for transmitting motion to the driving wheels 11 through the following connection: extending from pulleys 36, belts 38 passing over pulleys 39, 40 with the pulleys 40 mounted on a portion of the rotatably mounted wheels 11. The pulleys 39 are each rotatably mounted on a corresponding spring pressed thrust rod 41, in a manner shown in Figure 7, to normally tension the belt 38 to thereby provide a driving connection between pulleys 36 and 40. Such driving connection may be disestablished and established at will at the rear of the vehicle upon operation of the ratchet held manually operable lever 43 which structurally is like the emergency brake hand operated lever on present day automobiles.

Figures 2, 6:
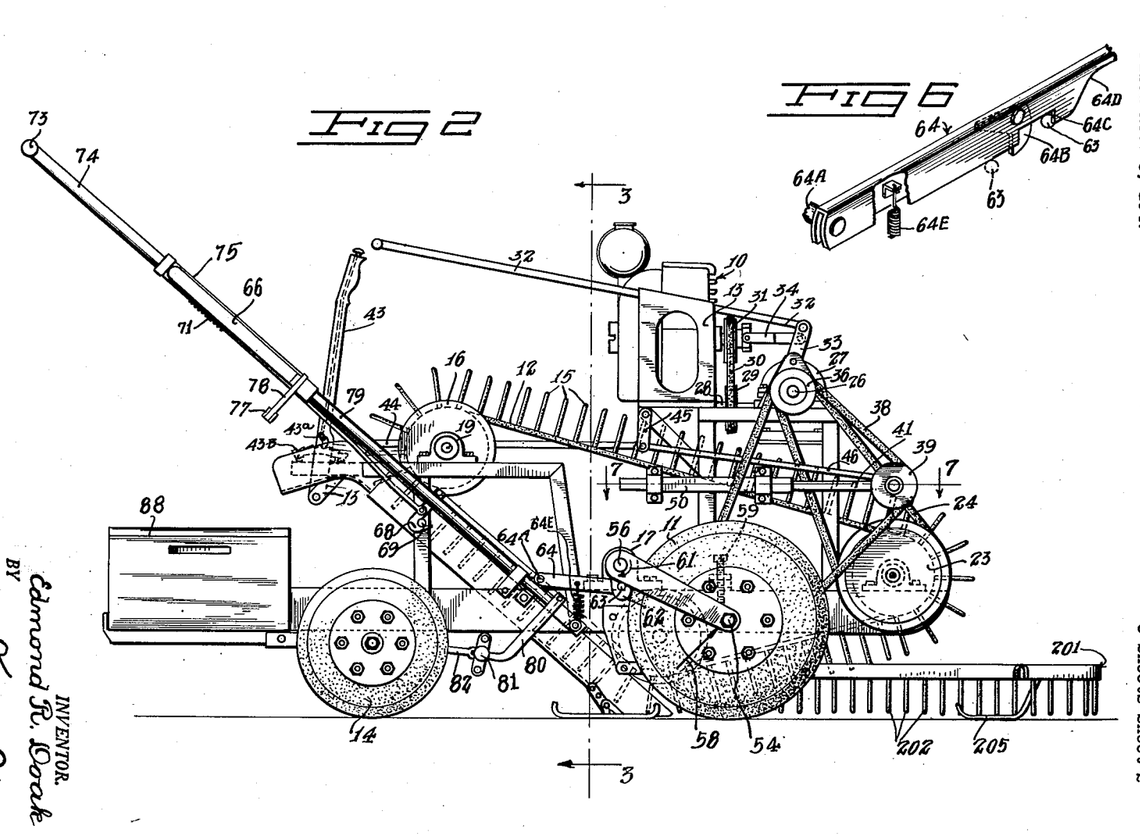
Figure 2 is a view in side elevation of the harvester shown in Figure 1 with the chassis of the harvester held in elevated position and with a portion thereof fragmented to show an adjustable stop against which the front wheel axle structure normally bears.
Figure 6 is a perspective view of a portion of the chassis elevating mechanism shown in Figure 2.
Figure 3:
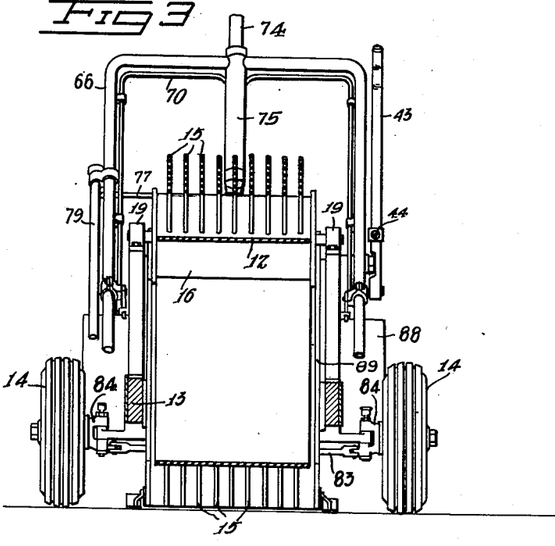
Figure 3 is a sectional view taken substantially on the line 3—3 of Figure 2.

The lever member 43 is pivotally mounted at its lower end on the frame structure 13 and has pivotally mounted on an intermediate point thereon one end of thrust rod 44, the other end of thrust rod 44 being pin connected to the synchronizing crank member 45 which extends laterally of the vehicle and is journalled on the frame structure 13. The free ends of this synchronizing crank member 45 have pin connected thereto on opposite sides of the vehicle one end of thrust rods 46 each having their other end pivotally connected to the corresponding spring biased thrust rod 41 as shown in Figure 6. Thus, both tensioning pulleys 39 may be moved synchronously to establish or disestablish a driving connection between the engine 10 and driving wheels 11 upon operation of the manually operable lever 43 which may be held in conventional manner in actuated position by engagement of the pivoted pawl 43A with the cooperating ratchet 43B on framework 13. It is apparent that when the upper end of the lever 43 is moved rearwardly the driving connection between engine 10 and wheels 11 is rendered ineffective but when the upper end of lever 43 is moved forwardly the spring pressed thrust rod 41 is free to move pulley 39 forward to thereby establish such driving connection.

The rod 41 may be spring biased forwardly in many different ways. For example, in Figure 7, the rod 41 may have an enlarged square head 49 slidably mounted in square tubing 50 which is stationarily mounted on framework 13. The rear end tubing 50 may be rounded to screwthreadedly maintain an adjustable tensioning screw 51 with the compressed compression spring 52 acting between screw 51 and head 49.

The provision of the adjustable tensioning pulley serves another purpose than establishing and disestablishing a driving connection between the engine 10 and driving wheels, namely, to also establish the desired tension in the driving belt 38 regardless of the position of the vertically adjustable driving wheels 11 whose axis of rotation may be raised and lowered with respect to its supporting framework 13 utilizing the structure described now.

Wheels 11 on each side of the vehicle are rotatably mounted on axles 54 each of which has its ends affixed to free ends of spaced crank members 55 which in turn are affixed to the laterally extending shaft 56 journalled in bearings 57 on framework 13 whereby the wheel axles 54 tend to move upwardly in the direction of the arrow 58 in Figure 2, but such movement is limited by engagement of the wheel axles 54 with the end of the adjustably mounted bolt 59 on framework 13. Thus, the height of the framework 13 with respect to the ground upon which the wheels 11 rest may be adjusted upon adjustment of the position of bolts 59, one of which is on each side of the vehicle. There is another means whereby the height of the framework 13 may be adjusted with respect to the ground and such means is described immediately below.

The framework 13 or chassis of the vehicle may be elevated with respect to the ground above its normal position determined by the position of bolt 59 upon rotating the shaft 56 in the direction indicated by the arrow 61 in Figure 2, the crank elements 62 on each side of the vehicle and mounted on the rotatably mounted shaft 56 being provided for that purpose. Each of the crank elements 62 has suitably fastened thereto laterally extending pins 63 arranged for an operating mechanism including: a spring biased gripping element 64 of special construction having one of its ends arranged to releasably engage pin 63 and the other one of its ends pin connected to the U-shaped manually operable steering gear supporting member 66 which in turn is pivotally connected on the chassis 13 at each side of the vehicle in such a manner that the chassis 13 may be raised by initially manually pivoting the U-shaped member forwardly to provide an operable gripping connection between the element 64 and pin 63 and then pivoting the U-shaped mmeber 66 rearwardly carrying with it the crank 62 thereby causing the forward portion of the chassis to raise. The U-shaped member 66 may be latched in such rearwardly moved position by engagement of the pivotally mounted latch member 68 thereon with the abutment 69 on the framework 13. This latch member 68 may be released from its latched position shown in Figure 2 by pulling upwardly on the attached manually operable U-shaped latch bar 70 which is slidably mounted on the supporting member 66 with a tension spring 71 pressing the bar 70 downwardly, spring 71 having one of its ends connected to the central portion of member 66 and the other one of its ends attached to latch bar 70.

The vehicle is steered by orienting synchronously the plane of rotation of each rear wheel 14, and specifically, by turning the steering bar 73 about the axis of its downwardly extending shaft 74 which is journalled for rotation in the central tubular post 75 of member 66. The lower end of shaft 74 has a crank arm 76 whose motion is imparted, in turn, to the wheels 14 through the following linkage: crank arm 76, thrust rod 77, crank 78 on the upper end of shaft 79 which is rotatably supported on the frame 66, crank 80 on the lower end of shaft 79, universal joint 81 between crank 80 and arm 82, and arm 82 on synchronizing rod 83 having its opposite end pivotally connected to the axle supporting structures 84 which in turn are pivotally connected on the supporting framework 13.

The universal joint 81 allows the pivotal movement of the frame member 66 described above in connection with raising of the vehicle frame or chassis 13; otherwise such movement would not be permitted since member 66 carries a considerable portion of the steering equipment.

The manner in which articles such as prunes are harvested from the surface of the ground is perhaps more clearly indicated in Figure 4. The endless belt 12 is, of course, moved as a unit in the direction indicated by the arrow 85 since it is mounted on the vehicle. In addition to the motion indicated by the arrow 85 the belt 12 travels around its pulleys in the direction indicated by the arrows 86 and 87 in its path of movement over the idler pulleys 16, 17 and driving pulley 18.

Of importance is the fact that the intermediate pulley 17 is so disposed as to cause the fingers 15 on the belt to gradually approach the surface of the ground to initially propel the fruit along the surface of the ground and then after passing the vicinity of pulley 17 to raise the fruit upwardly to discharge in the receptacle 88.

Figures 4, 5, 22, 23:
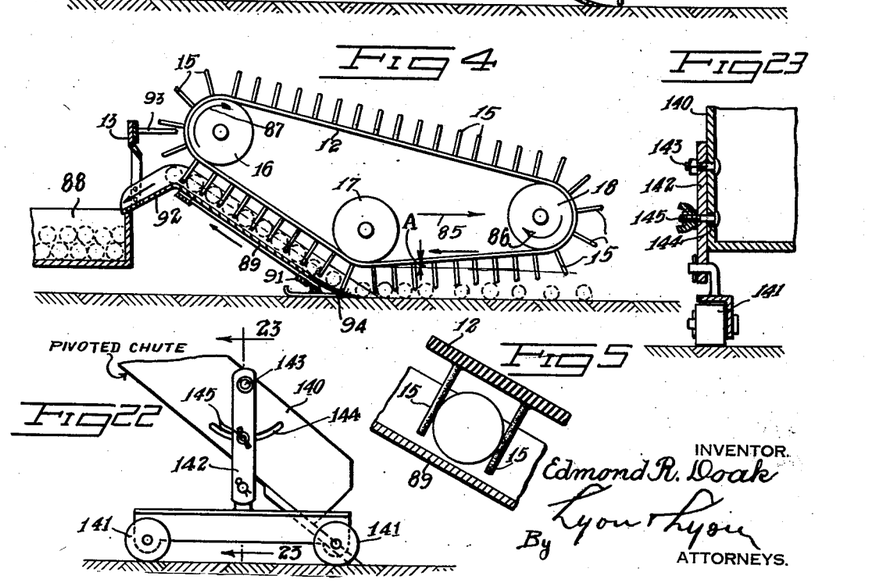
Figure 4 is a sectional view taken substantially on the line 4—4 of Figure 1 showing the manner in which the fingers on the endless belt initially propel and elevate fruit.
Figure 5 shows an enlarged portion of the endless belt shown in Figure 4 illustrating the manner in which fruit is usually carried out of contact with the adjacent loading chute.
Figures 22 and 23 illustrate modified structures arranged to hold the lower end of the loading chute in adjusted position with respect to the ground plane.

A loading platform 89 is slidably mounted on the angle iron guide members 90, 91 on the chassis of the vehicle and has a ground engaging skid member 94 mounted on its lower end. This loading platform 90 serves as a guide for fruit being moved from its engagement with the ground to an elevated position whence it may be discharged into the receptacle 88, but normally the fruit is confined as indicated in Figure 5 by the adjacent fingers 15 on the belt 12 in such a manner that the fruit does not rub against the surface of the loading platform 89.

If desired, the upper end of the load platform 89 may be provided with an integrally downwardly extending portion 92 upon which the fruit may roll after which it is released from engagement by the adjacent fingers when, as indicated in Figure 4, the annular spacing between the fingers as the belt travels around the pulley 16. In the event that some of the fruit remains held between the adjacent fingers, the fruit is removed by engagement with the stripper fingers 93 attached to the framework 13 with their free ends extending between the adjacent rows of fingers 15 on the belt. In other words, adjacent fingers 15 on the belt are automatically opened to release any fruit held therebetween but in the event that the fruit is too large or remains stuck between the opened fingers it is removed by the stripper fingers 93 which serve to deflect the fruit onto the downwardly extending portion 92 of the loading platform, from where it may roll into the receptacle 88.

The loading platform 89 is self-adjustable with respect to the level of the ground since it is slidably mounted in the angle iron guide members whence it may be removed as a unit by pulling upwardly on the downwardly extending portion 92 of the loading platform 89. Preferably, the lower end of the platform 89 terminates in a resilient ground engaging portion 94. The loading platform 89 may be mounted in other manners as indicated, for example, in the modified arrangements shown in Figures 22 and 23 which are described later.

The fingers 15 equally spaced in rows on the belt 12 may take different forms and shapes as shown in Figures 8 through 17, inclusive. In all of these arrangements the fingers are of resilient material and deformable to allow engagement with the fruit without producing damages thereto. It is noted that these fingers do not touch the ground but are mounted for gradual approach to the ground as described in Figure 4 to a lower position where they may contact and propel fruit on the ground and desirably to wedge the fruit between adjacent resilient fingers whereby it may be subsequently carried as indicated in Figure 5 without scraping the surface of the loaded platform 89.

In all cases, the belt 12 is preferably of resilient material such as sheet rubber whereby its inherent flexibility may add to the flexibility of the fingers.

Figures 8, 9, 10:
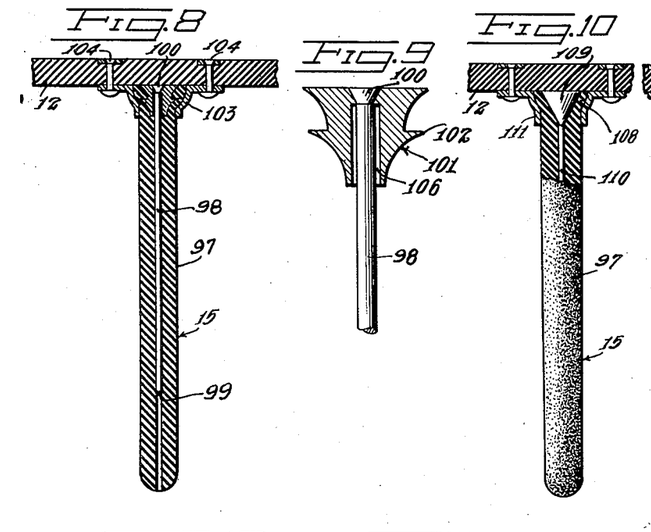
Figures 8-17 inclusive illustrate various types of resilient fingers and the many different ways in which they may be fastened to the endless belt shown in Figure 1.

In Figures 8 and 9 the resilient fingers 15 comprise a cylindrical rubber element 97 reinforced by a springy centrally disposed metal member 98 which extends outwardly from the belt to a point 99, a distance less than the full length of the rubber element 97. This metal reinforced member 98 has a conical base 100 arranged to be fitted into a conical recess in the barbed supporting base 101. This base member 101 has the annular barb 102 arranged to engage and securely fasten the rubber tubular member 97 when the annular fastening cap 103 is threaded into position indicated in Figure 8 and riveted to the belt 12 by rivet 104. Also, the base member 101 has an enlarged portion 106 through which the reinforced member 98 passes to allow freedom of movement of the member 98 which is supported as a cantilever.

In the arrangement shown in Figure 10 the base 108 of the resilient finger 97 is bulbous in form and has a conical opening for the reception therein of the conical base 109 of the cylindrical material reinforcing member 110. The bulbous base 108 is engaged by the cooperating fastening member 111 which in turn is riveted to the belt 12. Thus, in the assembly of the arrangement shown in Figure 10 the reinforcing member 110 is inserted in position in the resilient member 97, the annular fastening member 111 is threaded over the bulbous base 108 and is then riveted to the base 12.

Figure 11:
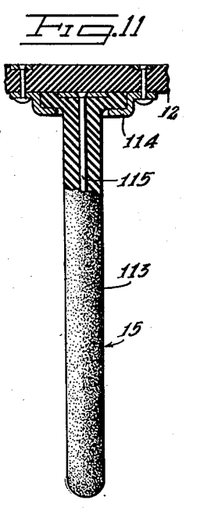

In the arrangement shown in Figure 11, the base of the cylindrical resilient member 113 is cylindrical for cooperation with the cylindrical fastening member 114 which in turn is riveted to the belt 12. Instead of the conical opening as in Figure 10, the opening in Figure 11 for reception of the enlarged base of the metal reinforcing member 115 is cylindrical. The finger 113 is assembled onto the belt 12 in Figure 11 by first inserting the reinforcing member 115 into the resilient member 113, threading the cylindrical fastening member 114 over the base of member 113 and then riveting the fastening member 114 to the belt 12.

Figure 12:
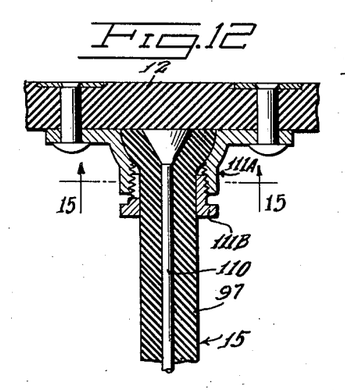

In the arrangement shown in Figure 12, the base of the resilient finger 97 is bulbous in form with a conical opening therein as shown in Figure 10 and the assembly comprising members 97 and 110 is replaceably mounted on the modified fastening member 111A by providing screw threaded closure member 111B having an external threaded portion in engagement with the internal threaded portion of the fastening member 111A.

Thus, if it is desired to remove the assembly 97 and 110 in Figure 12 for replacement or repair purposes the closure member 111B is screwed out and the assembly 97 and 110 is pulled out of its socket formed by the internal bulbous surface of the base member 111A which in turn is fastened in permanent manner as, for example, by means of rivets.

Figure 13:
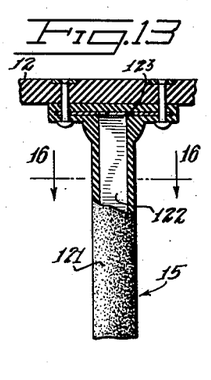
Figure 16:
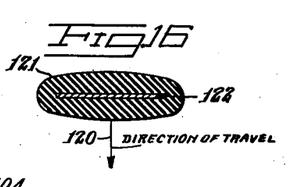

In the arrangement shown in Figures 13 and 16 the resilient finger member 121 has an oval shape with the minor axis of the oval in the direction of belt travel as indicated by the arrow 120. This oval resilient finger member 121 has centrally located therein and extending a distance slightly less than the length of the finger member 121 a reinforcing resilient strip member 122 having its base welded to the flat strip member 123 which in turn has spaced apertures therethrough for the passage of a fastening rivet. These fastening rivets pass through the oval base member 123 and belt 12 to secure the assembly thereon.

Figure 14:
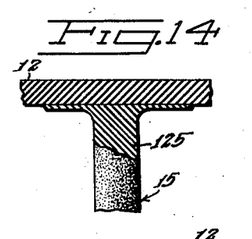
Figure 15:
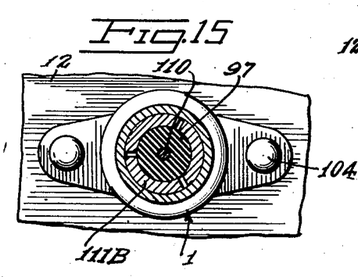

In Figure 14 the finger member 15 comprises a resilient finger member 125 which is fastened, for example, by vulcanization to the rubber belt 12.

Figure 17:
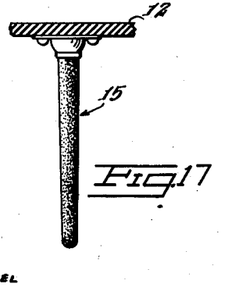

In the arrangement shown in Figure 17, the finger member 15 is fastened to the belt 12 in the manner shown in Figures 10 or 12 but in this arrangement the finger member 15 is tapered.

While I have shown a removable slidably mounted loaded platform 89 in my preferred embodiment the loading platform 89, as shown in Figures 22 and 23, may be pivoted to the framework 13 at its upper end with its lower end mounted in adjusted position on a supporting ground engaging roller structure. Thus, instead of the loading platform 89 sliding up and down in the frame to accommodate itself to the varying dips and humps on the ground surface as indicated in Figure 4, the same result may be obtained by pivoting the loading platform at its upper end with its lower end allowed to move on an arc as indicated in Figure 22 to achieve the same purpose.

In Figures 22 and 23 the loading platform 140 is pivotally connected to the carriage with ground engaging rollers 141 rotatably mounted thereon through an adjustably positioned link member 142 having its upper end pivotally connected at 143 to the loading platform 140. An intermediate portion of the platform is apertured at 144 for an adjustable fastening pin 145 which during adjustment may move in the arcuate aperture 144. Thus, the lower end of the loading platform 140 may be mounted in different adjusted positions with respect to the ground by unfastening the locking screw 145, rotating the link member 142 with respect to the loading platform 140 and then fastening the locking screw 145 in place.

Figure 20:
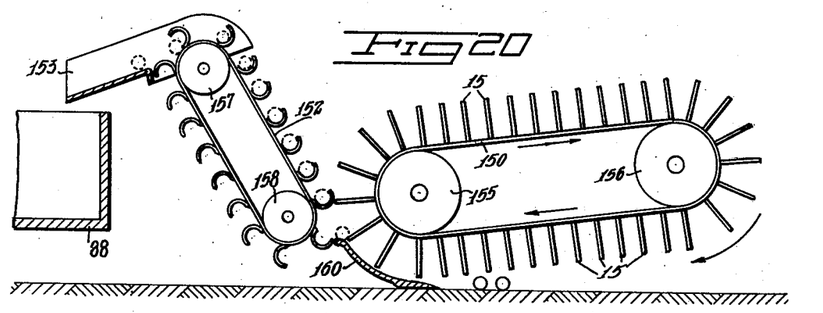
Figures 20 and 21 are sectional views similar to the sectional view shown in Figure 4 of other machines.
Figure 21:
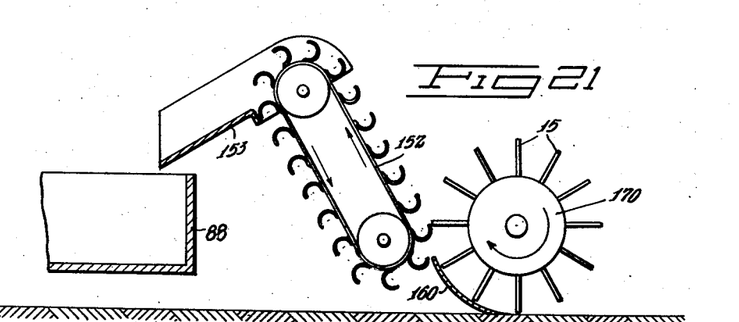

Figures 20 and 21 are views similar to views shown in Figure 4 exemplifying other modified arrangements. In Figure 20 the fingers 15 on the endless belt 150 approach the ground in a manner similar to that shown in my preferred embodiment in Figure 4, but in Figure 20 the fruit is raised by a separate independent conveyer belt 152 onto a discharge platform 153. The belt 150 passes over only two pulleys 155 and 156 and the conveyer belt 152 passes over only the two pulleys 157, 158, which pulleys may be traveling from the same prime movement in synchronized relationship. The intermediate guide member 160 between the belt 150 and conveyer belt 152 may be pivotally mounted to automatically adjust itself for varying ground conditions in the manner indicated in Figures 22 and 23.

In the arrangement shown in Figure 21, the fruit engaging fingers 15 are mounted on a circular belt or wheel 170 and serve to propel the fruit from the ground onto the second independent conveyor belt 152 to an elevated point where the fruit may fall therefrom onto the loading platform 153 from where it may roll into the discharge receptacle 88. The intermediate guide member 160 may be pivotally mounted as indicated in Figures 22 and 23 to automatically adjust itself for varying ground conditions.

Figure 18:
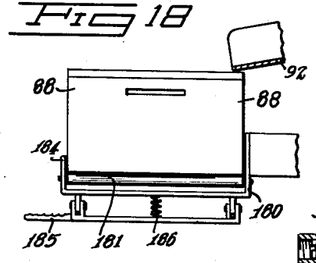
Figures 18 and 19 illustrate a modified structure embodying the present invention for carrying and unloading filled fruit receptacles on and from the harvester shown in Figure 1.
Figure 19:
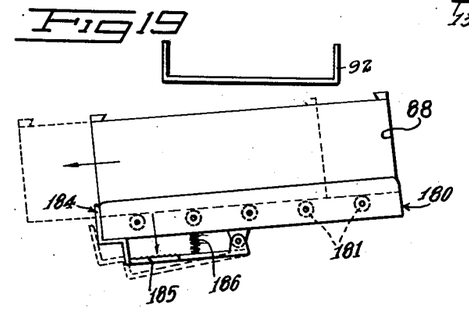

Preferably, the discharge box 88 is disposed on the harvester framework as indicated in Figures 18 and 19 so that it may be conveniently moved therefrom after it has been conveniently filled with fruit. The receptacle 88, which may be a wooden box, is placed on the extension 180 of the frame on rollers 181 mounted thereon. The upper surface of these rollers 181 lies on a plane sloping downwardly and to the left side of the machine so that the box tends to roll therefrom, but such movement of the box is prevented by the movable stop member 184 whose position may be controlled by the foot treadle 185, this stop member 184 is normally biased into a position where it prevents a box from rolling from the roller platform by the tension spring 186. When the box 88 is filled, and it is desired to remove the same from the harvester the operator places his foot on the treadle 185 and shoves the box to the left whereupon it is free to move from its normal position on the rollers 181 to the ground.

The front end of the harvester as shown in Figures 1 and 2 has mounted thereon fruit guiding means 200, 201 on opposite sides thereof for the purpose of guiding fruit or propelling fruit into a position for engagement with the fingers 15 on the belt 12 and also to deflect fruit out of the path of movement of the harvester wheels 11 and 14 by which it may otherwise be crushed.

This fruit guiding means 200, 201 preferably has a V-shaped nose as indicated in Figure 1 with fingers 202 equally spaced on the supporting frame 203 along its length extending downwardly in the direction of the ground, but not touching the ground. The finger supporting frame 203 may be pivotally mounted on the chassis of the harvester vehicle with its forward end held above the ground by its skid member 205 which, of course, follows irregularities in the terrain to maintain the ends of fingers 202 a predetermined distance above the surface of the ground.

While many different types of spring biased gripping elements 64 may be used I prefer to use that one shown in Figures 2 and 6 wherein the member 64 pivotally mounted on pin 64A on the manually operable U-shaped frame 66 has a gravity actuated combination cam member 64B pivotally mounted thereon adjacent the abutment 64C with a forward cam extension 64D.

The abutment 64C is arranged for releasable cooperation with the laterally extending pin 63 as explained previously to move the wheel axle 54 in Figure 2 in the direction of the arrow 58 to effectively alter the position of the vehicle chassis with respect to the ground.

Figures 2 and 6 show the relative positions when the U-shaped manually operable member 66 is latched in its forward position by engagement of the abutment 64C with pin 63. When it is desired to unlatch the U-shaped member 66 from engagement with the vehicle wheel axle moving means the U-shaped member 66 is initially pushed forwardly and then allowed to assume its rearward position. In such case the pin 63 moves over the gravity actuated cam member 64B in such forward movement of member 66 to the position indicated in dotted lines of Figure 6 and then in the subsequent rearward movement of member 66, pin 63 engages the bottom projecting tip of cam 64B thereby to cause it to pivot to a position where it guides further movement of the pin 63 over the abutment 64C onto the cam extension 64D. During all of such movement the member 64 is biased down against the pin 63 by the coil tension spring 64E having one of its ends anchored to member 64 and its other end anchored to the vehicle chassis.

The angle at which the endless belt 12 approaches the ground is of importance and this angle indicated by the letter A in Figure 4 in a machine built in accordance with the present invention may be an angle whose tangent is .143 or approximately 8°.

In the modified structure shown in Figure 24, the endless belt passing over pulleys 16, 17 and 18 is mounted for vertical adjustment by supporting the shafts of such pulleys 16, 17 and 18 on a movable frame member 200A which is connected by the parallelogram adjusting mechanism 201A to the chassis 202A. The movable frame member 200A has its plane parallel to the plane of the ground and is adjustable in the vertical direction upon manual operation of the pivoted lever member 203A, the lever member 203 being pivotally mounted on the chassis 202A and having an intermediate point thereon pin connected to one end of a thrust rod 204A which has its other end pin connected to the parallelogram adjusting mechanism 201A. The spring biased latching member 205A cooperates with the gear 206A on chassis 202A to maintain the lever 203A and frame member 200A in adjusted position. It is apparent that upon movement of the lever 203A the belt 12 may be adjusted vertically without altering the angle at which it approaches the ground.

In the modified arrangement shown in Figure 25, vertical adjustment of the belt 12 with respect to the ground is obtained by pivoting the belt as a unit about the axis of the shaft of pulley 18. The shafts of pulleys 16, 17 and 18 are journaled for rotation in the rigid triangular member 210, the forward end of the frame member 210 being supported on the bearing member 212 on the vehicle chassis 213 while the rear end of the triangular shaped frame 210 is held in vertically adjustable position on the chassis 213 by adjustment screws 215 which pass through tapered openings in extensions 216 and 217 respectively on chassis 213 and on frame member 210. Upon manual rotation of the adjusting screw 215, the rear end of the frame 210 is raised or lowered and pivots about the shaft of pulley 18. This adjustment allows relative movement between the belt 12 and the ground and also results in a change in the angle at which the belt 12 approaches the ground, the approach angle being steeper when the frame member 210 is lowered.

The loading platform 89 in Figure 4 is preferably constructed as shown in Figures 26, 27 and comprises a plurality of horizontally extending resilient tubular elements 220 whose opposite ends are maintained in spaced parallel frame members 221, 222. These resilient tubular elements 220 are preferably of rubber with spaces 223 therebetween to allow stones, clods of dirt and similar articles to fall therebetween as the fruit harvested is being raised. These rubber elements 220 are preferably maintained in stretched position in the modified conical seats 225 on the frame members 221 and 222. These resilient tubular elements 220 have enlarged ends 220A adapted to be snugly received within the seats 225 and may be inserted in position by placing one of the enlarged ends 220 in one of the seats 225, stretching the rubber element 220 in its longitudinal direction until the other enlarged end 220A thereof is positioned for insertion into the other seat 225 after which the force stretching the rubber element 220 is released to allow the stretched end to snap into position in the seat 225.

It will be appreciated that the endless belt 12 may find utility in other arrangements, for example, in the arrangement shown in Figure 28 wherein fruits of different sizes initially placed on the conveyer belt 230 and traveling in the direction indicated by the arrow 231 may be graded in size. For this purpose, the belt 12 is positioned so that in its travel in the direction indicated by the arrow 232, it approaches the plane of the endless belt 230 at an angle of about 8° or less whereby the fruit of larger diameter is initially contacted by the fingers 15 to cause its deflection in a transverse direction upon engagement with the stationary fruit guide members 235, 236, 237, 238 and 239, as the case may be, depending upon the size of the fruit. In other words, fruit of largest diameter is contacted by the fingers 15 and the stationary guide 235 to propel and direct such fruit in the general direction indicated by the arrow 240, while fruit of smaller diameter passes over the guide member 235 and is directed by the guide member 236 in a direction generally parallel to the direction indicated by the arrow 240. It is noted that the guide members 235 extend in a direction nonperpendicular to the direction of belt travel indicated by the arrow 231 and since the belt 12 gradually approaches the plane of the endless belt 230, it may be desirable to tilt the plane of the belt 12 at its lowest point of travel with respect to the horizontal by tilting the axis of the shafts of pulley members 16, 17 and 18 with respect to the horizontal. In such case, the tilting of the shafts of pulleys 16, 17 and 18 is related to the angle at which the guide member 235 is placed, so that when the ends of guide members 235 are at the same elevation, the ends of fingers 15 immediately adjacent the member 235 are at the same distance therefrom.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a machine of the character described, a vehicle, an endless belt having fruit engaging means movably mounted on said vehicle, the path of movement of said belt being parallel to the direction of movement of the vehicle, means arranged to drive said belt at a greater linear speed than the linear speed of said vehicle and a pair of forwardly disposed arcuate fruit guiding means comprising a plurality of downwardly extending elongated inherently resilient fingers arranged to guide fruit in the direction of said belt.

2. In a machine of the character described, a framework, an endless belt having elongated inherently flexible article engaging means mounted on said framework for movement in a predetermined path and a loading platform extending parallel to a substantial length of said belt, said platform extending forwardly and downwardly and being mounted on the framework with its forward end movable in accordance with height variations in and on the ground, said platform being slidably mounted in guides on the framework through which the platform may be withdrawn from the framework as a unit.

EDMOND R. DOAK.

References Cited in the file of this patent

UNITED STATES PATENTS

| Number | Name | Date |
|---|---|---|
| 973,421 | Franzmeier | Oct. 18, 1910 |
| 1,078,234 | Wyckoff | Nov. 11, 1913 |
| 1,304,774 | Humphries | May 27, 1919 |
| 1,378,275 | Rademacher | May 17, 1921 |
| 1,476,207 | Lint | Dec. 4, 1923 |
| 1,570,094 | Stevens | Jan. 19, 1926 |
| 1,573,125 | Robbins | Feb. 16, 1926 |
| 1,632,203 | Threefoot et al. | June 14, 1927 |
| 1,650,796 | Kellogg | Nov. 29, 1927 |
| 1,669,497 | Steegmuller | May 15, 1928 |
| 1,879,905 | Liebfried | Sept. 27, 1932 |
| 1,888,309 | Cramer | Nov. 22, 1932 |
| 1,921,651 | Behling | Aug. 8, 1933 |
| 2,059,776 | De Back | Nov. 3, 1936 |
| 2,065,169 | Carpenter | Dec. 22, 1936 |
| 2,091,064 | Bates | Aug. 24, 1937 |
| 2,133,512 | Herge | Oct. 18, 1938 |
| 2,253,797 | Melroe | Aug. 26, 1941 |
| 2,363,251 | Jurisich | Nov. 21, 1944 |
| 2,378,144 | Kittler | June 12, 1945 |
| 2,402,201 | Martin | June 18, 1946 |
| 2,424,148 | Carelock | July 15, 1947 |
| 2,483,650 | Lee | Oct. 4, 1949 |